Figure 1:
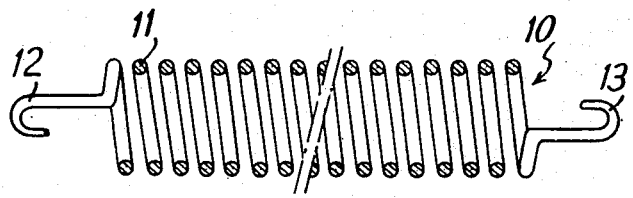

United States Patent [19]

Cahour et al.

[11] 3,814,565

[45] June 4, 1974

[54] SUPPORT FOR RUBBER AND LIKE PIPES AND HOSES

[75] Inventors: Maurice Alphonse Jules Cahour; Truc Le Trung; Lucien Gaston Signoret, all of Decize, France

[73] Assignee: Pneumatiques, Caoutchouc Manufacture et Plastiques Kleber-Colombes, Colombes, France

[22] Filed: Feb. 9, 1972

[21] Appl. No.: 224,777

[30] Foreign Application Priority Data
Feb. 10, 1971   France .............................. 71.04368
Mar. 8, 1971    France .............................. 71.08005

[52] U.S. Cl. ................. 425/392, 249/178, 249/183, 425/393
[51] Int. Cl. ............................................. B29h 5/00
[58] Field of Search ........... 425/392, 393, 357, 368, 425/369; 269/47, 48, 48.1, 52; 267/166, 180; 249/179, 183, 175, 178

[56] References Cited
UNITED STATES PATENTS
1,749,117   3/1930    Weichsel ........................ 267/166 X
2,908,940   10/1959   Jones ................................... 425/392
2,961,749   11/1960   Brown, Jr. et al. ............... 269/52 X
2,968,855   1/1961    Stolz ............................... 249/183 X
3,005,286   10/1961   Derham ......................... 267/166 X
3,304,581   2/1967    Kramer et al. ................. 425/392 X
3,705,780   12/1972   Kramer et al. ................. 425/392 X
3,727,940   4/1973    Hug .................................... 267/180

FOREIGN PATENTS OR APPLICATIONS
635,003   2/1962    Italy ................................. 267/180

Primary Examiner—Richard B. Lazarus
Attorney, Agent, or Firm—Brisebois & Kruger

[57] ABSTRACT

This invention relates to the manufacture of elbowed pipes from rubber and like elastomeric materials. The invention is based on the known method which consists in placing a straight pipe prior to vulcanisation in contact with a coaxially arranged deformable shaping element, whereafter the assembly of pipe and element is deformed to a desired shape and is then vulcanised, after which the pipe is separated from the element. According to the invention, the deformable shaping element is made from at least one metal helix. This metal helix is preferably preformed to the shape of the elbowed pipe to be produced. The invention also includes a deformable shaping element for use in the method. Although the expression "pipes" is used, it will be clear that it includes hoses and any other similar tubular member, where the context so admits.

2 Claims, 12 Drawing Figures

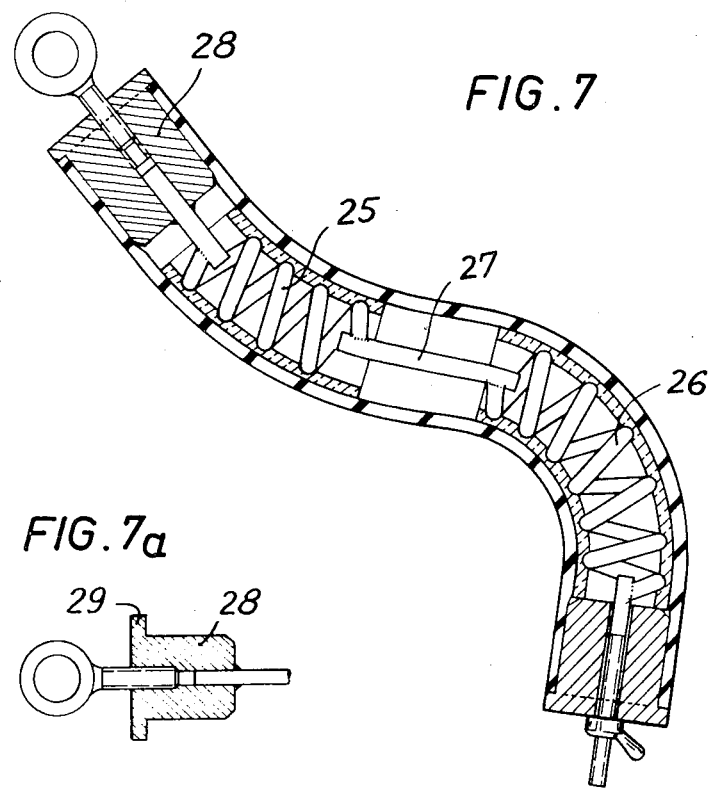
FIG. 7
FIG. 7a
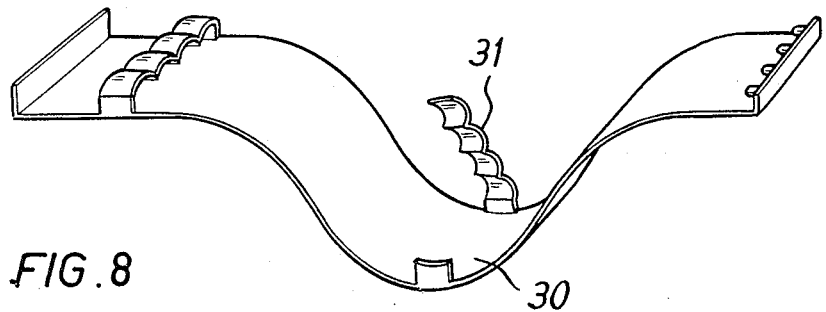
FIG. 8

SUPPORT FOR RUBBER AND LIKE PIPES AND HOSES

The present invention relates to the manufacture of pipes and hoses from elastomeric materials such as rubber, and having an elbow or similarly cranked portion along the length thereof. The invention also relates to means for making such pipes and hoses and to the products of the method and means.

More particularly, the invention is applied to the manufacture of pipes and hoses for connecting two members of a machine or an engine and which must, on account of the presence of other members preventing connection by a rectilinear pipe, be elbowed or cranked in dependence upon each particular application at one or more places along their length in order to pass around said members. It is one object of the invention that the curvature of the pipe or hose must follow a predetermined path in an accurate manner according to a predetermined angle and radius of curvature.

The manufacture of such elbowed pipes and hoses is complicated on account of the fact that they must, despite the different treatments which they undergo during their manufacture, have over their entire length a desired cross-section (the latter is uniform when the pipe is cylindrical). It must be borne in mind that the cross-section of a length of a pipe or hose subjected to a curving operation tends to become deformed during such operation.

Different present-day techniques enable elbowed pipes and hoses to be produced and some of the products can even have a desired cross-sectional shape, in satisfactory manner.

They have nevertheless the decisive drawback of being either techniques which are of still too much an amateur character or techniques employing manufacturing apparatus and means which are too bulky and inconvenient in use. In fact, no techniques up to now have been actually realisable industrially nor do they enable both good profit-earning capacity to be achieved by the efficient rationalisation of the factory, particularly with large-scale production. These techniques, in fact, require well-defined manufacture of some types of elbowed pipes or hoses which are defined, for example, by reason of the angular arrangement of the different curves with respect to one another, or for any other reason.

There is known, for example, a technique referred to as "shaping on preshaped mandrel." This technique is the most widely used at the present time; it consists in imparting the desired shape to a rubber pipe blank by fitting on a rigid mandrel having the shape of the finished vulcanised pipe, in passing the assembly into vulcanising apparatus and in withdrawing the pipe or hose from the mandrel, the latter only being able to be used again for producing another pipe or hose identical to that previously produced.

Hereinafter, for convenience of expression, reference will be made simply to "pipes" but it should be understood that that term is herein used to define pipes, hoses or indeed any tubular member appropriate to the context.

The drawbacks presented by this technique are very well known to the man skilled in the art. They reside more particularly to the necessity of manufacturing for each section of pipe, a suitable set of tools which, in addition, is heavy, bulky and costly, in the necessity of using a lubricating mixture for passing the pipe or blank over the rigid mandrel and removing it therefrom, and in the necessity of effecting all these operations solely manually which clearly are extremely laborious in all respects.

Another method is also known which consists in arranging blanks of crude rubber, i.e., non-vulcanised rubber mix containing the vulcanising ingredients therein, in a trough or mould made to the shape or profile of the desired finished pipe. However, due to the fact that the cross-section of a non-vulcanised blank will become oval when it is curved, this method can only be used if the radii of curvature are large.

This method is, in fact, only used to produce elbowed pipes of small internal diameter, for example 5 to 6 mm, i.e., pipes into which it is difficult to insert a rigid mandrel dimensioned to suit their internal diameter.

In other methods known at the present time, a non-vulcanised or slightly vulcanised rectilinear blank is placed on a mandrel made of lead or other malleable alloy, whereupon the assembly is curved to the desired profile, the blank is vulcanised, then vulcanisation there of is terminated and the mandrel is withdrawn which is, of course, easily possible because it is deformable.

This apparently attractive method is, in fact, costly and impractical as a result of which it has not been used or only used very little. In fact, after each operation, the mandrel has to be straightened so that, being made from a material which badly withstands bending, it rapidly becomes unusable; the difficulties of passing the material over a mandrel, the diameter of which is that of the pipe, are such that frequently lubrication has been effected by injecting air under pressure between the mandrel and the pipe which tends to dilate the pipe and generally imposes placing it in a tube to limit such dilation.

The type of deformable mandrel used also does not enable pipes of relatively large diameter to be shaped, for the mandrel thus becomes more and more difficult to deform as the diameter of the pipe blank increases.

It is a further object of the invention to provide a method of manufacturing an elbowed pipe made from rubber or like material, and means for applying this method, in which the passing of the blanks over the mandrel and the shaping operations before vulcanisation thereof, and also the subsequent removal from the mandrel after vulcanisation, can be effected more easily than hitherto. Furthermore, another object is that the method and means shall be suitable for all types of profiles and diameter of pipes, including those which with the methods known hitherto, could not be effected by reason of too small radii of curvature or small angles of curvature, both being combined sometimes with a somewhat large inner diameter; the method and means should also have the advantage of being particularly well adapted to quantity production and automation, whilst enabling at the same time great ease of adaptation to the various types of elbowed pipes to be manufactured.

The invention is characterised more particularly by the fact that the pipe blank to be elbowed is placed in contact with one or more metal helices forming a hollow deformable element produced in the shape of the hollow inner part of the pipe blank, furthermore by the fact the blank provided with the metal helix or helices is deformed to the desired curvature, also by the fact that during the entire duration of vulcanisation the shape given to the blank is retained, and by the fact that the helix or helices forming the shaping element or elements for the pipe are withdrawn from the finished pipe.

In practising the invention, the passing of the pipe blank over, and its removal from, the mandrel are effected with a great saving of power because it is now possible to decrease the diameter of the shaped element if the latter has to be placed within the pipe blank to be elbowed, or of increasing it if it has to be outside this pipe.

The element for shaping the pipe blanks may be formed by a single metal helix, for example of spring steel, the convolutions of which are preferably close-wound and may be of any suitable cross-sections, i.e., circular or even such that they may offer a planar contact surface with the rubber of the blank.

Alternatively, the element may be formed by a plurality of helices of metal wires crossed at a setting angle which is equal and of opposite direction, with respect to the axis of the element to form a framework, the diameter of which may be changed by traction or longitudinal compression. In order to facilitate the transverse and longitudinal deformations, these helices may be made of very fine metal wires of the order of 0.3 mm.

The element thus shaped, and made from fine wires, has a very good deformability which requires very little effort, and sufficient elasticity itself to reassume its initial shape by reason of the fact that the helices are positioned according to a setting angle corresponding to the angle of balance. The angle of balance is that angle which enables the helices to return to their normal condition when the helices are removed from the pipe blank.

The helix made from spring steel or helices of braided or plaited metal wires may be used separately; a helix made from spring steel may also be arranged in contact with an element made from helices of braided or plaited metal wires or with another intermediate element (cloth for example) so as to protect the wall or walls of the pipe blank to be curved against the marks and impressions capable of being made, more particularly in the elbows, by the edges of the helical convolutions.

The pipe blank, together with its shaping element or elements inserted thereinto, is held during the entire vulcanisation operation by a rigid exterior holding device such that, on account of the increased rigidity of the blank by the presence of the shaping element, the latter may be made not to the full size of the blank so that it does not hold the blank over its entire width, in the manner of a trough, but only along its curves in the manner of racks provided with movable flanges.

The holding in shape of the blank may also be effected by using a shaping element comprising a helix made of spring steel, by causing the latter to assume the desired shape and profile during its own manufacture, before it is tempered. This solution dispenses with all other aforementioned exterior holding means, and is particularly advantageous for quantity manufacture of elbowed pipes of the same kind.

Figure 2:
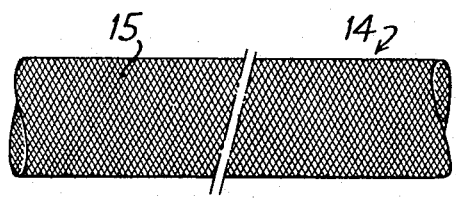
Figure 3:
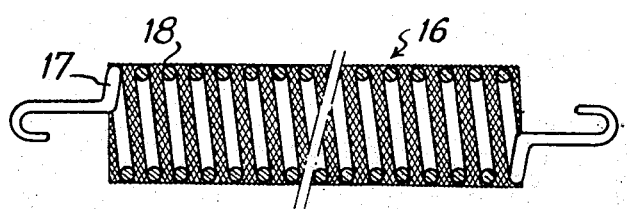
Figure 4:
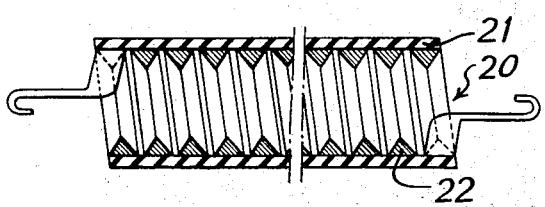
Figure 5:
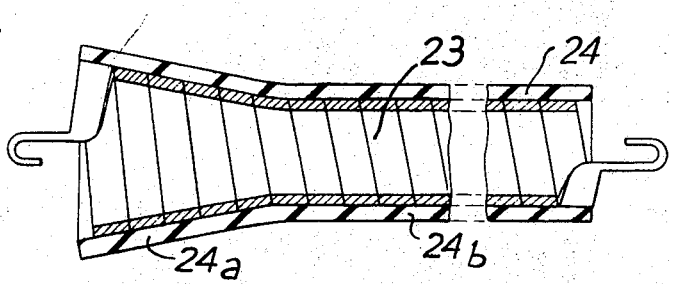
Figure 6:
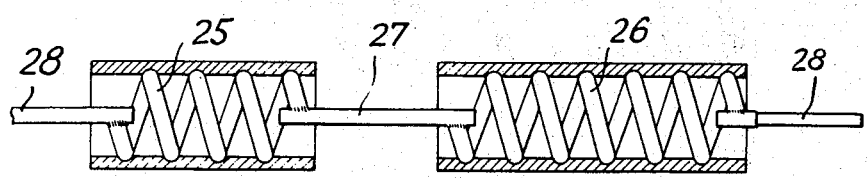
Figure 9:
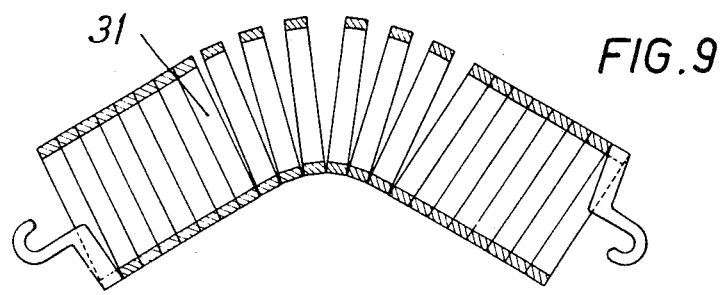
Figure 10:
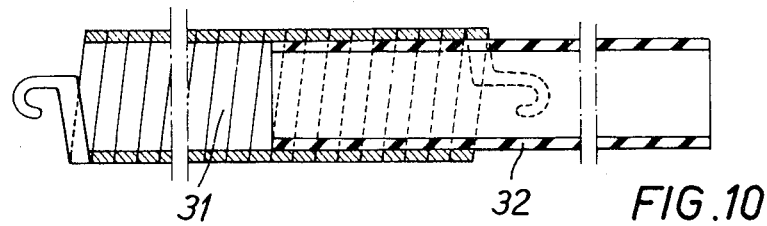
Figure 11:
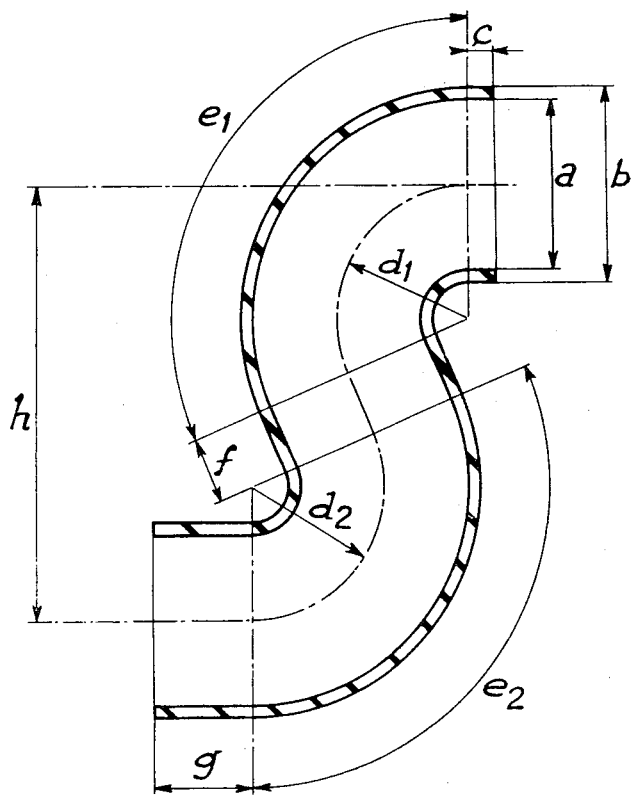

In order that the invention may be more clearly understood, reference will now be made to the accompanying drawings which show certain embodiments thereof by way of example, and in which:

FIG. 1 shows in longitudinal section a first embodiment of cylindrical element for shaping a pipe blank to be elbowed, FIG. 2 shows a view of part of a second embodiment of shaping element, FIG. 3 shows a longitudinal section of a third embodiment of shaping element, FIG. 4 shows a longitudinal section of a fourth embodiment of shaping element shown within a pipe blank, FIG. 5 shows a longitudinal section of a fifth embodiment of shaping element whose cross-section varies along its length, FIG. 6 shows a longitudinal section of a sixth embodiment of shaping element, FIG. 7 shows a longitudinal section of a vulcanised elbowed pipe, including the shaping element of FIG. 6, FIG. 7a shows a longitudinal section of a detail of FIG. 7 showing a sleeve for producing collars at the ends of the pipes, FIG. 8 shows in perspective apparatus enabling, during vulcanisation, holding a plurality of pipes shaped according to an identical profile, FIG. 9 is a longitudinal section of a seventh embodiment of a shaping element formed by a helix made from spring steel and pre-formed to enable the shaping and retaining in shape of the pipe blank with which it will be in contact, FIG. 10 shows in longitudinal section a rectilinear blank of a pipe during the introduction of the shaping element of FIG. 9 thereinto, and FIG. 11 shows a longitudinal section of an elbowed pipe produced by the method of the invention, shown after extraction of the shaping elements.

Referring now to the drawings, the shaping element 10 of FIG. 1 is a helicoidal helix, the convolutions 11 of which forms a cylinder and are close-wound and have a circular cross-section; this helix is extended at the two ends by hooks 12 and 13 enabling attachment thereof to means for effecting traction on the element if and when desired. The length of this shaping element will vary, depending upon the use to which it will be put; usually, it is similar to that of the pipe, but it may be smaller or larger as will be seen hereinafter.

The shaping element 14 of FIG. 2 is formed from an assembly of metal wires 15 which are sufficiently thin to be easily manoeuvrable but nevertheless are inherently rigid. These metal wires may be regularly distributed around the periphery of the element and are positioned by means of a braiding or plaiting machine in two crossed layers each formed of parallel wires, the setting angle of a layer formed by these wires being equal to the axial direction but of reverse direction to that of the wires of the other layer; the wires of one layer pass alternately above and below the wires of the other layer.

The metal wires of each layer make with the longitudinal axis an angle of approximately 55°, i.e., an angle which corresponds substantially to the angle of balance.

This signifies that in this position the metal wires replace themselves in their initial arrangement, when they are removed from the blank.

The element behaves as if it possessed resilient recoil when it is subjected to traverse or longitudinal deformations, the elastic recoil being due to the mutual interlocking of the wires of the layers, but also to the selected angle of setting.

The shaping element 16 of FIG. 3 is composed of a helicoidal element 17 made of spring steel such as that of FIG. 1, also covered on the face intended to be in contact with the rubber of the pipe to be curved, by a braided element 18 such as that of FIG. 2.

This shaping element has the advantage of enabling elbowing of a pipe with the aid of a resiliently deformable element which leaves a few, if any, impressions on the receiving face of the pipe wall. The protective layer thus formed, due to the mutual movement of the metal wires, avoids any possibility of formation of folds or tears in the face of excessive stresses, as would be the case if the element were covered by a protective textile fabric.

The elements for shaping pipe blanks to be elbowed hereinbefore described have given satisfactory results as regards both ease of handling of the operations and the neatness of the finished work. This element was formed from a helix of spring steel, the close-wound convolutions of which have a circular cross-section and a diameter of 10 mm. On this helix, the outer diameter of which was 15 mm, was woven a protective element of 17 mm outer diameter with wires of 0.3 mm placed at 55°.

In place of the helix having a circular cross-section made of spring steel as has just been described, the latter may have a section of another geometrical shape whereby the face intended to be in contact with the wall of the rubber pipe is flat. Such an element is shown in FIG. 4, where a helix 20 placed within a pipe blank 21, has a triangular cross-section 22 (although it could be semi-circular), the apex of which is directed inwardly, i.e., towards the longitudinal axis of the element. If this helix is in contact with the outer face of the pipe to be elbowed, the apex of the triangular section or the rounded part of the semi-circular cross-section are directed inwardly.

Similarly, the spring steel helix may have a rectangular cross-section or the like such as the helix 25 of FIG. 5. This helix is placed within a pipe blank 24 which has the peculiarity of not having a uniform cross-section as do the preceding pipe blanks. The blank 24 is formed from truncated conical part 24a and a cylindrical extension 24b, is elbowed, according to the method of the invention in the same manner as the other blanks, the operations of passing the blank over and removing it from the element not presenting any particular difficulties if only the small end of the shaping element 23 has to be inserted.

The shaping element of FIG. 6, also shown in FIG. 7, is made from two helices 25 and 26 of spring steel similar to the helix of FIG. 1, connected together by a resilient connecting rod 27 corresponding to the straight part of the pipe of FIG. 7 elbowed definitely after vulcanisation thereof. The ends of these helices are connected to and disconnected from rods 28 on passing the blank over and removing it from the pipe, respectively.

This shaping element may also be conceived in a similar manner to the shaping elements of FIGS. 2 and 3.

In the embodiment of the elbowed pipe of FIG. 7, movable tips 28 of slightly greater diameter than the inner diameters of the pipes, have been fitted in a manner to increase the inner diameter and to form fixing collars on the finished pipe, i.e., parts by which the pipe will be fitted to piping of an installation. These tips may also comprise bearing shoulders 29 which facilitate positioning thereof.

When the pipe blanks are provided with one or two shaping elements according to the invention, they are deformed and/or held in shape during vulcanisation by placing them for example in apparatus such as the jig shown in FIG. 8.

So as to improve the performance of the shaping and shape-retaining apparatus together with that of the vulcanisation apparatus, one or more pipes may be concentrically arranged if their profiles are similar and their diameters different, which enables the bulkiness to be reduced and a plurality of pipes to be produced at the same time. This solution is rendered possible by the invention; an element similar to those of FIGS. 1, 2 or 3 is then placed within a pipe blank which may or may not be provided with another shaping element. Another pipe blank of smaller diameter than the preceding blank is inserted into this other shaping element. Thus, two pipes may be prepared without the bulk being increased.

The shape maintaining apparatus of FIG. 8 is apparatus which is economical and simple to produce and which enables the shaping elements of the invention to be used for all other types of profiles. This apparatus is formed from a sufficiently rigid sheet 30 expanded to give it the desired shape, and flanges 31 which enable the different blanks, provided with their shaping elements, to be placed parallel side-by-side. It will be noted that the simple presence of these flanges 30 is sufficient to maintain the blanks in shape by reason of the presence of the shaping elements which prevent the latter from becoming oval.

Another means for holding in shape pipe blanks (FIGS. 9 and 10) consists in preforming, in the profile of the pipes to be produced, the element which serves for shaping it when the latter is composed by a helix made from spring steel such as the element 31 of FIG. 9. In order to make this resiliently deformable shaping member in the profile of the pipe to be produced, one proceeds in a manner known per se, independent of the invention, for example, by imparting this profile thereto before tempering.

Thus, contrary to the operation with rectilinear springs the use of which has been described hereinbefore, the use of a complementary device for maintaining the shape of the blank during vulcanisation thereof is no longer necessary.

Although the helix made of spring steel is preformed, no particular difficulties are encountered for placing it in contact with a blank. For example, for introducing a blank 32 (FIG. 10) within the spring 31, the spring is deformed in a manner that it is rectilinear and is substantially in the line of the blank which is also rectilinear; under these conditions the blank is easily placed within the helix, the diameter of which can, moreover, be increased by slightly untwisting it. The blank being within the pipe, the stresses rendering it rectilinear cease to be exerted; it thus reassumes its original shape of its own accord by curving the pipe blank 32 which is thus both shaped and held in the desired shape and is ready to be vulcanised.

Naturally, the resilient recoil shape of the deformable helix must be sufficient to enable the blank to curve according to the desired radius and angle of curvature.

After the resiliently deformable helix 31 has been withdrawn, the latter assumes its initial shape of its own accord and is ready to be used again for manufacturing another elbowed pipe.

The method of the invention, as is apparent, has numerous possibilities and enables all types of elbowed pipes to be produced; in each particular case, whatever it is, it is possible to select shaping elements according to the invention.

Thus, the elbowed pipe of FIG. 11 intended for vehicle use, and ahown at half scale, has been able to be produced by the method of the invention, although it has not been able to be by any one of the methods habitually used up to the present time.

The sizes of this pipe having equal, opposite and very closely related curvatures were as follows: inner diameter $a = 76$ mm, outer diameter $b : 86$ mm, thickness of the walls: 5 mm, length of the rectilinear end $c$: 10 mm, the radii of curvature $d_1$ and $d_2$: 58 mm, the angles of curvature $e_1$ and $e_2$: 110°, the length $f$ of the central rectilinear part: 34 mm, the length $g$ of the other rectilinear end: 45 mm, the distance $h$ between the axes of the rectilinear parts $c$ and $g$: 190 mm.

In order to produce this pipe, two shaping members according to the invention have been used placed over the entire length of the blank, one on the inside and one on the outside. These two members were helices made from spring steel, the convolutions of which were almost close-wound; the latter had a rectangular section of 4 mm × 2 mm in size for the outer helix and 5 mm × 1.5 mm for the inner helix.

The length of these two helices were slightly greater than that of the pipe so that no gaping of the outer rectilinear parts $c$ and $g$ occurs during curving. Nevertheless, some difficulties are encountered by reason that during curving, the convolutions are applied against each other; these difficulties have been removed by using helices having convolutions of triangular cross-section, the base of the triangle being in contact with the blank.

We claim:

1. A device for supporting a pipe made from an elastomeric material, during shaping and vulcanisation thereof, said device comprising at least one metal helix made of spring steel, with attachment members projecting from each end thereof, and wherein said metal helix is covered by a braid consisting of at least two helices of metal wires, the metal wires of one wire helix passing alternately above and below the wires of the other wire helix in woven configuration, and the wires of each said wire helix making with the longitudinal axis of the device an angle which is equal to but of reverse direction to that formed by the wires of the other said wire helix with the said longitudinal axis.

2. A device according to claim 1 wherein the wires of each said wire helix make an angle of the order of 55° with the longitudinal axis of the device.

* * * * *